United States Patent
Lipkin et al.

(10) Patent No.: US 10,738,616 B2
(45) Date of Patent: Aug. 11, 2020

(54) SYSTEM AND METHOD FOR MAINTENANCE OF A TURBINE ASSEMBLY

(71) Applicant: General Electric Company, Schenectady, NY (US)

(72) Inventors: Don Mark Lipkin, Niskayuna, NY (US); Scott Michael Oppenheimer, Niskayuna, NY (US); Mark Zajkowski, Austerlitz, NY (US); Todd Danko, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 113 days.

(21) Appl. No.: 15/290,130

(22) Filed: Oct. 11, 2016

(65) Prior Publication Data
US 2018/0100396 A1  Apr. 12, 2018

(51) Int. Cl.
*F01D 5/00* (2006.01)
*F01D 5/12* (2006.01)
(Continued)

(52) U.S. Cl.
CPC .............. *F01D 5/005* (2013.01); *B23P 6/002* (2013.01); *F01D 5/12* (2013.01); *F01D 9/02* (2013.01);
(Continued)

(58) Field of Classification Search
CPC .. F01D 5/005; F01D 5/12; F01D 9/02; H04N 5/38; H04N 5/44; H04N 7/183;
(Continued)

(56) References Cited

U.S. PATENT DOCUMENTS 6,414,458 B1 * 7/2002 Hatley ...................... B25J 5/00
180/6.5
7,032,279 B2 * 4/2006 McCarvill ............... B23P 6/002
29/402.19
(Continued)

FOREIGN PATENT DOCUMENTS

DE  10 2011 122 759 A1  5/2013
WO     2013/064242 A2     5/2013
WO     2013/138055 A1     9/2013

OTHER PUBLICATIONS

A A Baker, "Repair of cracked or defective metallic aircraft components with advanced fibre composites—an overview of Australian work", Composite Structures, vol. 2, Issue: 2, pp. 153-181, 1984.
(Continued)

*Primary Examiner* — Gelek W Topgyal
(74) *Attorney, Agent, or Firm* — The Small Patent Law Group LLC; Mary D. Lawlor (57) ABSTRACT

A maintenance apparatus includes a flexible carriage configured to anchor between adjacent airfoils of a turbine assembly. The maintenance apparatus includes a maintenance tool operably coupled with the flexible carriage. The maintenance tool is configured to one or more of generate image data representative of one or more surfaces of the turbine assembly or repair the one or more surfaces of the turbine assembly. The maintenance apparatus comprises one or more motors operably coupled with the maintenance tool and configured to move the maintenance tool relative to the flexible carriage.

25 Claims, 9 Drawing Sheets

(51) Int. Cl.
*F01D 9/02* (2006.01)
*H04N 7/18* (2006.01)
*H04N 5/38* (2006.01)
*H04N 5/44* (2011.01)
*B23P 6/00* (2006.01)
*F01D 25/28* (2006.01)
*H04N 5/225* (2006.01)

(52) U.S. Cl.
CPC ............... *H04N 5/38* (2013.01); *H04N 5/44* (2013.01); *H04N 7/183* (2013.01); *F01D 25/285* (2013.01); *F05D 2230/72* (2013.01); *F05D 2230/80* (2013.01); *F05D 2240/12* (2013.01); *F05D 2240/24* (2013.01); *F05D 2260/38* (2013.01); *F05D 2260/80* (2013.01); *H04N 2005/2255* (2013.01)

(58) Field of Classification Search
CPC ............ F05D 2230/72; F05D 2230/80; F05D 2240/12; F05D 2240/24; F05D 2260/80
See application file for complete search history.

(56) References Cited

U.S. PATENT DOCUMENTS

| | | |
|---|---|---|
| 7,093,993 B2 | 8/2006 | Skoog et al. |
| 7,509,735 B2 | 3/2009 | Philip et al. |
| 7,588,797 B2 | 9/2009 | Skoog et al. |
| 8,196,305 B1 * | 6/2012 | Hansen ............... G01B 5/0004 33/530 |
| 8,221,825 B2 | 7/2012 | Reitz et al. |
| 8,367,967 B2 | 2/2013 | Zajchowski et al. |
| 8,400,501 B2 | 3/2013 | Heyworth et al. |
| 8,563,080 B2 | 10/2013 | Hopkins |
| 8,587,660 B2 * | 11/2013 | Mitra .................... H04N 7/18 348/158 |
| 8,602,722 B2 | 12/2013 | George et al. |
| 8,636,890 B2 | 1/2014 | Woodard et al. |
| 8,797,398 B2 * | 8/2014 | Drescher .......... G01N 21/95692 348/92 |
| 9,540,497 B2 | 1/2017 | Lipkin et al. |
| 2003/0229420 A1 * | 12/2003 | Buckingham ....... A61B 1/0055 700/245 |
| 2006/0078193 A1 * | 4/2006 | Brummel ........... G01N 21/8806 382/152 |
| 2007/0157733 A1 * | 7/2007 | Litzenberg ........... G01N 29/043 73/644 |
| 2007/0276629 A1 * | 11/2007 | Koonankeil ........... F01D 5/005 702/185 |
| 2009/0172934 A1 * | 7/2009 | Mall ..................... F01D 5/027 29/402.01 |
| 2009/0223446 A1 * | 9/2009 | Baltz ...................... B05B 5/03 118/629 |
| 2009/0278924 A1 * | 11/2009 | Heyworth ............ F01D 21/003 348/82 |
| 2013/0167375 A1 * | 7/2013 | Roesing ................ F01D 5/005 29/888.3 |
| 2013/0199279 A1 * | 8/2013 | Boles ................ G01N 27/9026 73/112.01 |
| 2015/0092039 A1 * | 4/2015 | Ruhge .................... G01B 21/16 348/82 |
| 2015/0174837 A1 | 6/2015 | Kolvick et al. |
| 2015/0174838 A1 | 6/2015 | Kittleson et al. |
| 2015/0175486 A1 | 6/2015 | Roberts et al. |
| 2015/0240984 A1 * | 8/2015 | Choi ..................... H04N 7/185 348/84 |
| 2015/0300920 A1 * | 10/2015 | DeAscanis ........... G01M 15/14 356/614 |
| 2017/0361470 A1 * | 12/2017 | Otero Del Real ....... B25J 18/02 |
| 2018/0003060 A1 | 1/2018 | Lipkin et al. |

OTHER PUBLICATIONS

International Search Report and Written Opinion issued in connection with corresponding PCT Application No. PCT/US2017/53581 dated Dec. 14, 2017.

* cited by examiner

SYSTEM AND METHOD FOR MAINTENANCE OF A TURBINE ASSEMBLY

FIELD

The subject matter described herein relates to systems and methods for one or more of inspecting or repairing interior surfaces of a turbine assembly.

BACKGROUND

Turbines for aircraft engines as well as gas and steam powered turbines for industrial applications comprise at least one rotor carrying multiple stages of airfoils (henceforth referred to as blades), which rotate with respect to the turbine case. In turn, a turbine case carries multiple stages of airfoils (henceforth referred to as guide vanes), such that the turbine consists of alternating stages of blades and guide vanes. To reduce leakage of air, steam, or combustion gas over the tips of the blades, shrouds can be disposed on the radially inner surfaces of the stator so as to form a ring seal around the blade tips. To limit air, steam, combustion gas, or the like from entering the rotor cavities or wheel spaces, blades have platforms and guides vanes have inner sidewalls. Similarly, guide vanes have outer sidewalls to limit radially outward leakage. Together, the blades, guide vanes and shrouds define the primary flowpath inside the turbine.

During use, the turbine components can experience degradation. Currently, periodic inspections, such as borescope inspections, are performed in order to assess the condition of the turbine in-between service intervals. Examples of damage that can be observed during inspection include wear (e.g., from incursion of blade tips into the shrouds, particle-induced erosion, water droplet induced erosion, wear due to sliding contact between stationary components), impact (e.g., spallation of thermal barrier coating (TBC) or environmental barrier coating (EBC) from turbine-section components, leading edge burring/bending of compressor blades), cracking (e.g., thermal fatigue, low-cycle fatigue, high-cycle fatigue, creep rupture), edge-of-contact damage between stationary parts, oxidation or hot corrosion of high-temperature metallic sections, static seal degradation, and creep deformation (e.g., of guide vane sidewalls/airfoils, blade platforms, and tip shrouds).

During service intervals, the turbines are at least partially disassembled to allow repair and/or replacement of damaged components. Currently, damaged components of turbine engines are primarily repaired at overhaul or component repair facilities, with only limited intervention conducted in the field. The processes used to repair compressor and turbine flowpath components may include surface cleaning so as to remove accumulated dirt and oxidation products, stripping and restoration of coated surfaces, crack repair, section replacement, aero contouring and smoothing, and the like. Although the cost of the repair operations is typically lower than the component replacement cost, waiting for planned outages may run some fraction of components beyond their repair limits and may even lead to unplanned outages caused by the failure of the most heavily distressed component. Consequently, conventional systems and methods of maintaining turbines using periodic inspections and factory-based component repair methods may not be optimal.

To address the above described problems, there have been disclosed in situ methods of repairing a damaged component, such as an abradable coating (e.g., U.S. Pat. Nos. 7,509,735, 8,563,080, U.S. Patent Application Publication No. 2015/0174837). However, these prior disclosures are focused on borescope-type access using small-diameter, tethered tools. These tools are severely limited for the purpose of maintenance because they are constrained in size and can access only limited locations within the gas turbine engine. Furthermore, even if a damaged area can be reached, the orientation of the tool to a damaged area may be disadvantageous for performance of an inspection or repair task. The size restrictions imposed by borescope access port diameter limit the capability of inspection and repair tools, and the access path may cause jamming or severing of the tether. Accordingly, the present invention seeks to provide a novel system of maintaining turbine assemblies that overcomes the above-mentioned limitations by using a remotely controlled maintenance apparatus that is inserted in the machine via alternate routes, such as axially through the turbine, and may be operated with or without a tether.

BRIEF DESCRIPTION

In one embodiment, a maintenance apparatus comprises a flexible carriage configured to anchor between adjacent airfoils of a turbine assembly. The maintenance apparatus comprises a maintenance tool operably coupled with the flexible carriage. The maintenance tool is configured to one or more of generate image data representative of one or more surfaces of the turbine assembly or repair the one or more surfaces of the turbine assembly. The maintenance apparatus comprises one or more motors operably coupled with the maintenance tool and configured to move the maintenance tool relative to the flexible carriage.

In one embodiment, a maintenance apparatus comprises a flexible carriage configured to anchor between adjacent airfoils of a turbine assembly. The maintenance apparatus comprises a maintenance tool operably coupled with the flexible carriage. The maintenance tool is configured to one or more of generate image data representative of one or more surfaces of the turbine assembly or repair the one or more surfaces of the turbine assembly. The maintenance apparatus comprises one or more motors operably coupled with the maintenance tool and configured to move the maintenance tool relative to the flexible carriage, wherein the flexible carriage is configured to flexibly move about interior components of the turbine assembly during one or more of inserting or extracting of the maintenance apparatus into or out of the turbine assembly.

In one embodiment, a method comprises anchoring a maintenance apparatus between adjacent airfoils of a turbine assembly. The maintenance apparatus comprises a flexible carriage, a maintenance tool, and one or more motors. The maintenance apparatus is configured to one or more of generate image data representative of one or more surfaces of the turbine assembly or repair the one or more surfaces of the turbine assembly.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
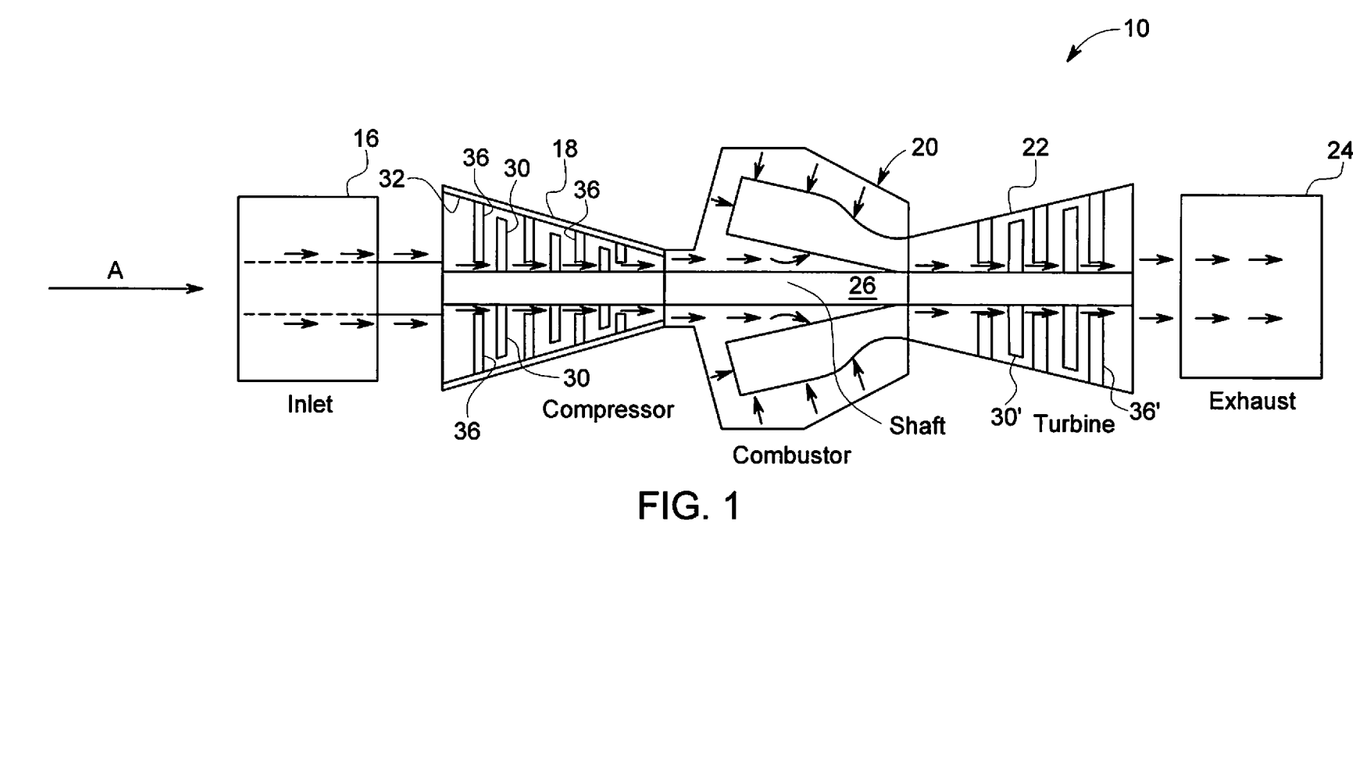
FIG. 1 illustrates one embodiment of a turbine assembly.

FIG. 1 illustrates a turbine assembly 10 in accordance with one embodiment. The turbine assembly 10 includes an inlet 16 though which air enters the turbine assembly 10 in the direction of arrow A. The air travels in the direction A from the inlet 16, through a compressor 18, through a combustor 20, and through a turbine 22 to an exhaust 24. A rotating shaft 26 runs through and is coupled with one or more rotating components of the turbine assembly 10.

The compressor 18 and the turbine 22 comprise multiple airfoils. The airfoils may be one or more of blades 30, 30' or guide vanes 36, 36'. The blades 30, 30' are axially offset from the guide vanes 36, 36' in the direction A. The guide vanes 36, 36' are stationary components. The blades 30, 30' are operably coupled with and rotate with the shaft 26.

Figure 2A:
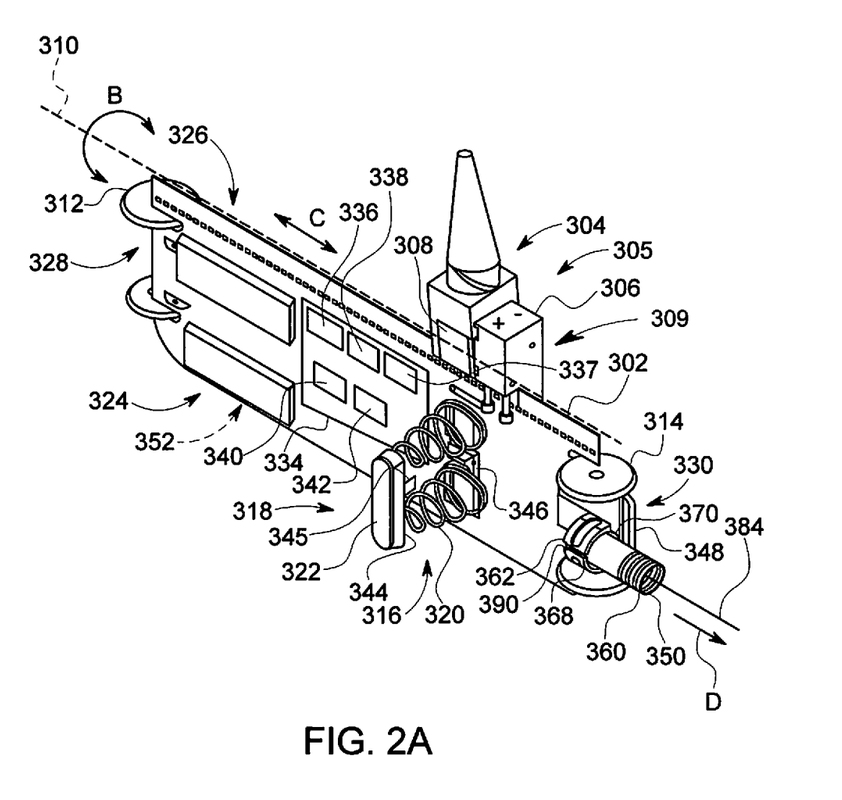
FIG. 2A illustrates one embodiment of a maintenance apparatus.

FIG. 2A illustrates a maintenance apparatus 300 in accordance with one embodiment. The maintenance apparatus 300 may be used for one or more of inspection or repair of the interior of a turbine assembly 10. The maintenance apparatus 300 enters the turbine assembly 10 through the inlet 16. Optionally, the maintenance apparatus 300 enters the turbine assembly 10 through the combustor 20 or the exhaust 24. Once the maintenance apparatus 300 is located at the desired axial position within the turbine assembly 10, rotation of the rotor is used to bring the maintenance apparatus 300 into proximity of the target turbine components so as to do one or more of inspect or repair the turbine assembly 10.

The size and/or shape of the maintenance apparatus 300 is scaled relative to the size of the turbine assembly 10. For example, the maintenance apparatus 300 may be sized to move within and/or around components of the turbine assembly 10. Alternatively, the size and/or shape of the maintenance apparatus may be scaled relative to an alternative assembly in order to one or more of inspect or repair such alternative assemblies. For example, the maintenance apparatus may be sized and/or shaped to move within and/or around small machinery, engines, piping systems, or the like.

The maintenance apparatus 300 has a front end 328 and a rear end 330. The maintenance apparatus 300 includes a flexible carriage 302 that extends between the front end 328 and the rear end 330 of the maintenance apparatus 300. The flexible carriage 302 is elongated along a longitudinal axis 310. The flexible carriage 302 may be generally rectangular in shape. For example, the flexible carriage 302 may be shaped as a thin strip of flexible material. Optionally, the flexible carriage may be another shape.

The flexible carriage 302 has a front side 324 and a back side 326. The flexible carriage 302 is generally thin along the normal between the front side 324 and the back side 326. The front side 324 and the back side 326 of the flexible carriage comprise one or more carriage pads 352. In the illustrated embodiment, two carriage pads 352 are shown only on the front side 324. Optionally, the front and back sides 324, 326 may comprise any number of carriage pads 352. The flexible carriage 302 may be a single component made of a flexible material that is capable of sustaining large deflections. For example, the flexible carriage 302 may be made up of a fiberglass reinforced plastic material. Additionally or alternatively, the flexible carriage 302 may be made of an alternative material. The flexible carriage 302 is illustrated in FIG. 2A as a single component. Optionally, the flexible carriage may be made of multiple pieces of flexible and/or non-flexible material operably joined together, such as with hinges, elastic spring elements, magnets or the like. For example, the one or more pieces may operably join once inside of the turbine assembly 10. Optionally, the flexible carriage may have an alternative configuration.

The maintenance apparatus 300 includes an electronic system 334 having a remote communication device 336, one or more antennas 337, one or more processors 338, a power source 340 (e.g., a battery), and one or more motor control units 342. Optionally, the electronic system 334 comprises a data storage system. Optionally, the electronic system 334 may include components that may be duplicated or eliminated in any combination to provide a device capable of remotely communicating, wirelessly or the like. An external communication control system (not shown) communicates with the control units 342 via the remote communication device 336. The remote communication device 336 can represent one or more transceivers, receivers, transmitters, or the like. For example, the remote communication device 336 may communicate wirelessly with components inside of and/or outside of the turbine assembly. The antenna 337 remotely receives control signals from an external system (not shown). The external system (not shown) remotely controls operation of the maintenance apparatus 300 and/or receives data, such as image data or motor state data, from the maintenance apparatus. The antenna 337 can be any device used to transmit or receive electromagnetic signals, such as radio wave signals. The control unit 342 can represent hardware circuitry that includes and/or is connected with the one or more processors 338 (e.g., microprocessors, integrated circuits) that receive control signals from an external system to remotely control movement and other operations of the maintenance apparatus 300. Additionally or alternatively, the electronic system 334 may receive control signals from a wired communication device outside of the turbine assembly 10 to allow for wired control of the maintenance apparatus 300. Optionally, the maintenance apparatus 300 may operate autonomously. For example, the maintenance apparatus 300 may operate independently without receiving one or more of wired or wireless remote control signals.

The maintenance apparatus includes an anchoring device 316 having one or more anchoring mechanisms, such as springs 320 operably connected to a locking pad 318. The one or more springs 320 are joined to the flexible carriage 302 on the front side 324 and extend in a direction generally away from the flexible carriage 302. Optionally, the one or more springs 320 may be joined to the back side 326 of the flexible carriage 302. The one or more springs 320 are positioned between the flexible carriage 302 and the locking pad 318. For example, the one or more springs 320 are joined to the flexible carriage 302 at a first end of the springs 320 and joined to the locking pad 318 at a second end of the springs 320. The locking pad 318 comprises a mating surface 322 and a spring surface 344. The mating surface 322 and the spring surface 344 are generally co-planar with the flexible carriage 302. The spring surface 344 mates with the one or more springs 320 and is positioned facing the flexible carriage. The mating surface 322 is positioned facing away from the flexible carriage 302. Optionally, the locking pad 318 may have an alternative shape with surfaces that are generally non-planar with the flexible carriage 302. Optionally, the anchoring device 316 may comprise only the one or more springs 320 and may be devoid of the locking pad 318.

Figure 2B:
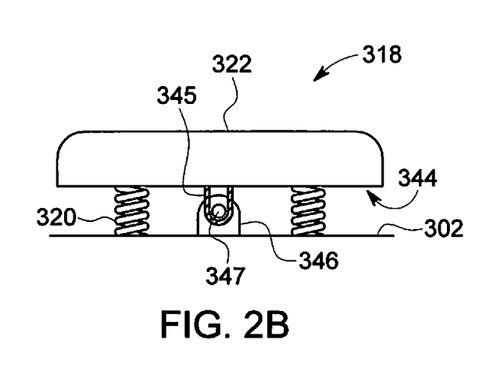
FIG. 2B illustrates one embodiment of a preset anchoring device.
Figure 2C:
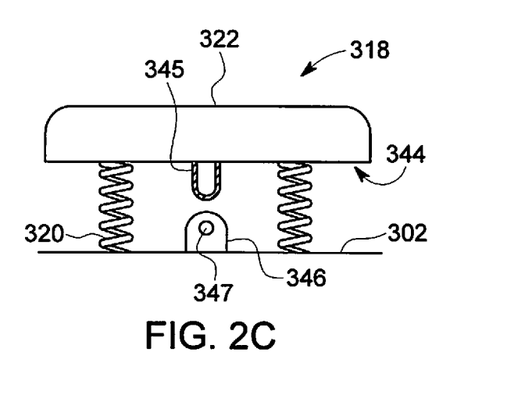
FIG. 2C illustrates one embodiment of a deployed anchoring device.

FIG. 2B illustrates the anchoring device in a preset position. FIG. 2C illustrates the anchoring device in a deployed position. The anchoring device 316 comprises a trigger mechanism 346 and a locking pad retainer 345. The trigger mechanism 346 is operably connected with the locking pad retainer 345 via a trigger wire 384 through a hole 347 to maintain the anchoring device 316 in the preset position (e.g., the springs 320 are compressed) during insertion, as illustrated in FIG. 2B. When the trigger wire 384 is withdrawn from the trigger mechanism 346 and the locking pad retainer 345, the anchoring device 316 moves to a deployed position, as illustrated in FIG. 2C. The one or more springs 320 decompress and transfer the locking pad 318 of the anchoring device 316 between the preset position and the deployed position. The one or more springs 320 move from the preset to the deployed positions in a direction generally away from the front side 324 of the flexible carriage 302. In the preset position, the one or more springs 320 are compressed and the locking pad 318 is positioned proximal the front side 324 of the flexible carriage 302 relative to the deployed position. In the deployed position, the one or more springs 320 are released from the compressed preset position and the locking pad 318 is positioned distal the front side 324 of the flexible carriage 302 relative to the preset position.

Returning to FIG. 2A, the maintenance apparatus 300 comprises one or more front pilot wheels 312 joined to the flexible carriage 302 and positioned at the front end 328 of the maintenance apparatus 300. The maintenance apparatus 300 comprises one or more rear pilot wheels 314 joined to the flexible carriage 302 and positioned at the rear end 330 of the maintenance apparatus 300. The front pilot wheels 312 and the rear pilot wheels 314 rotate about axes generally perpendicular to the longitudinal axis 310 and in the plane of the flexible carriage 302. In the illustrated embodiment, two front pilot wheels 312 and two rear pilot wheels 314 are illustrated. Optionally, the maintenance apparatus may comprise any number of front wheels 312 or rear wheels 314. Additionally or alternatively, the maintenance apparatus 300 may comprise a common number of front and rear wheels 312, 314. Optionally, the maintenance apparatus 300 may comprise an independent number of front and rear wheels 312, 314. Optionally, the wheels may be omitted or replaced by rollers, bushings, bearings, low-friction bumpers, or the like.

The maintenance apparatus 300 comprises a maintenance tool 304 operably connected with the flexible carriage 302. The maintenance tool 304 can do one or more of inspect or repair one or more surfaces of the turbine assembly 10. Various embodiments of the maintenance tool 304 will be discussed in detail below.

A motor system 305 is operably coupled with the maintenance tool 304. The motor system 305 comprises one or more of an axial traverse motor 306, a pivot motor 308, or an extension motor 309 that move the maintenance tool 304 relative to the flexible carriage 302. The motor system 305 is operably coupled with the electronic system 334. For example, the electronic system 334 may control operations of the one or more of the axial traverse motor 306, the pivot motor 308, or the extension motor 309 of the motor system 305. The axial traverse motor 306, the pivot motor 308, and the extension motor 309 move the maintenance tool 304 in order for the maintenance tool 304 to access a 3-dimensional space within the turbine assembly 10. The axial traverse motor 306 of the motor system 305 moves the maintenance tool 304 along the at least one axis of the flexible carriage 302. For example, the axial traverse motor 306 moves the maintenance tool 304 along longitudinal axis 310 of the flexible carriage 302 in a direction C. For example, the axial traverse motor 306 may move the maintenance tool 304 to a position along the flexible carriage 302 between the front end 328 and the rear end 330 of the maintenance apparatus 300. The pivot motor 308 pivots the maintenance tool 304 about the longitudinal axis 310 in the direction indicated by arc B. For example, the pivot motor 308 pivots the maintenance tool 304 in the direction indicated by arc B relative to the flexible carriage 302. The extension motor 309 extends the maintenance tool 304 in a direction away from the flexible carriage 302. The extension motor 309 may radially extend and retract the maintenance tool with respect to the longitudinal axis 310. For example, the extension motor 309 radially extends the maintenance tool relative to the flexible carriage 302 in order for the maintenance tool 304 to reach one or more surfaces of the turbine assembly 10. For example, the axial traverse motor 306, pivot motor 308, and extension motor 309 allow the maintenance tool 304 to axially move, pivot, and extend relative to the flexible carriage 302. Additionally or alternatively, the maintenance apparatus 300 may comprise one or more axial traverse motors, pivot motors, or extension motors configured to move, pivot, extend other components along or about other axis relative to the flexible carriage.

The maintenance apparatus 300 includes an attachment bracket 368. The attachment bracket 368 is disposed on the flexible carriage 302 positioned proximate the rear end 330 of the maintenance apparatus 300. For example, the attachment bracket 368 can be positioned proximate the rear pilot wheels 314. Optionally, the attachment bracket 368 may be operably coupled with one or more of the rear pilot wheels 314. The attachment bracket 368 is disposed on the flexible carriage 302 on a same side as the anchoring device 316. For example, FIG. 2A illustrates the attachment bracket 368 and the anchoring device 316 disposed on the front side 324 of the flexible carriage 302. Optionally, the attachment bracket 368 and the anchoring device 316 may be disposed on an alternative side of the flexible carriage 302. Optionally, the attachment bracket 368 and the anchoring device 316 may be disposed on opposite sides of the flexible carriage 302. The attachment bracket 368 has a removal feature 348, a locking slot 390, and a receiving orifice 370. The removal feature will be discussed in more detail below with regards to FIG. 9. The locking slot 390 is sized and shaped to receive a locking clip 378 of a mating component 350 of an insertion device 351. The receiving orifice 370 is sized and shaped to receive the mating component 350 of the insertion device 351.

Figure 3:
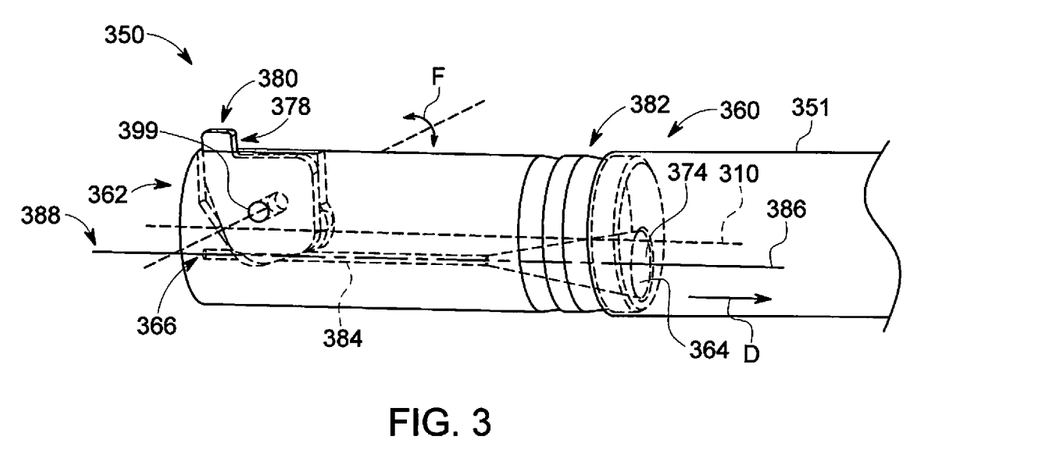
FIG. 3 illustrates one embodiment of a mating component of an insertion device for a maintenance apparatus.

FIG. 3 illustrates one embodiment of the mating component 350 of the insertion device 351. The mating component 350 is positioned proximate to and is operably connected with the maintenance apparatus 300. The mating component 350 has a circular cross-section and is elongated along the longitudinal axis 310. Alternatively, the mating component 350 may be of an alternative cross-section and/or shape. The mating component 350 has a distal end 360 and a proximal end 362, and a passage 374 that extends between the distal end 360 and the proximal end 362. The distal end 360 has a distal passage opening 364. The proximal end 362 has a proximal passage opening 366. The distal and proximal passage openings 364, 366 may be a common size. Optionally, the distal passage opening 364 may have a unique size relative to the proximal passage opening 366.

A portion of the distal end 360 of the mating component 350 has one or more ribs 382 positioned about the longitudinal axis 310. The one or more ribs 382 operably connect with the insertion device 351 at the distal end 360. The insertion device 351 is sufficiently flexible to allow the insertion device 351 to bring the maintenance apparatus 300 into proximity of the target location between adjacent airfoils. For example, the insertion device 351 may be a rod, a cable, a tube, or the like, that is joined to the mating component 350 at the distal end 360 and held in a position relative to the mating component 350 by the one or more ribs 382. Alternatively, the insertion device 351 may be held in a position operably joined to the mating component 350 by threads, cables, screws, magnets, clamps, or the like.

The mating component 350 has a locking clip 378. The locking clip 378 is positioned at the proximal end 366 of the mating component 350. The locking clip 378 pivots from a locked position to an unlocked position about a pivot pin 399. For example, the locking clip 378 pivots about axis F. A locking tab 380 extends out and away from the body of the mating component 350 so to interfere with the locking slot 390 when the locking clip 378 is in the locked position. For example, the locking tab 380 protrudes from the body of the mating component 350 when the locking clip 378 is in the locked position, creating a mechanical attachment to the proximal end 362 of the attachment bracket 368 at the locking slot 390. The locking tab 380 is contained within the body of the mating component 350 when the locking clip 378 is in the unlocked position.

The mating component 350 receives the trigger wire 384 through the passage 374. A proximal end 388 of the trigger wire 384 extends a distance away from the proximal end 362 of the mating component 350 to the trigger mechanism 346 of the anchoring device 316 and is detachably coupled with the trigger mechanism 346 and the locking pad retainer 345 of the maintenance apparatus 300. Additionally, a distal end 386 of the trigger wire 384 extends a distance away from the distal end 360 of the mating component 350 and at least partially through the insertion device 351 so that the trigger wire 384 may be controlled from outside of the turbine assembly 10. For example, the trigger wire 384 extends from outside of the turbine assembly 10, through the insertion device 351, through the passage 374 of the mating component 350, to the trigger mechanism 346 of the maintenance apparatus 300.

The trigger wire 384 is operably connected with the locking clip 378 within the passage 374 of the mating component 350. The locking clip 378 transfers from the locked position to the unlocked position when the trigger wire 384 is retracted from the proximal passage opening 366 in a direction D. For example, the locking clip 378 may be biased to the unlocked position. Withdrawal of the trigger wire 384 from the mating component 350 allows the locking clip 378 to transfer from the locked position to the unlocked position, thus releasing the mating component 350 of the insertion device 351 from the attachment bracket 368.

Returning to FIG. 2A, the mating component 350 is detachably coupled with the attachment bracket 368. For example, the mating component 350 is positioned within the receiving orifice 370 of the bracket 368. The proximal end 362 of the mating component 350 is positioned such that the locking tab 380 of the mating component 350 is aligned with the locking slot 390 of the attachment bracket 368.

The mating component 350 of the insertion device 351 is locked within the receiving orifice 370 when the locking clip 378 is received within the locking slot 390. The position of the mating component 350 is maintained within the receiving orifice 370 when the locking clip 378 is in the locked position and the locking tab 380 is received in the locking slot 390. The locking tab 380 extends radially outward from the mating component 350 into the locking slot 390 and prevents the mating component 350 from moving in the direction D away from the maintenance apparatus 300. For example, the locking tab 380 engages with the locking slot 390 to prevent axial movement of the mating component 350. The mating component 350 detaches from the receiving orifice 370 and may be removed from the maintenance apparatus 300 when the locking clip 378 moves into the unlocked position. For example, the mating component 350 may detach from the receiving orifice 370 when the locking tab 380 disengages from the locking slot 390.

Figure 4:
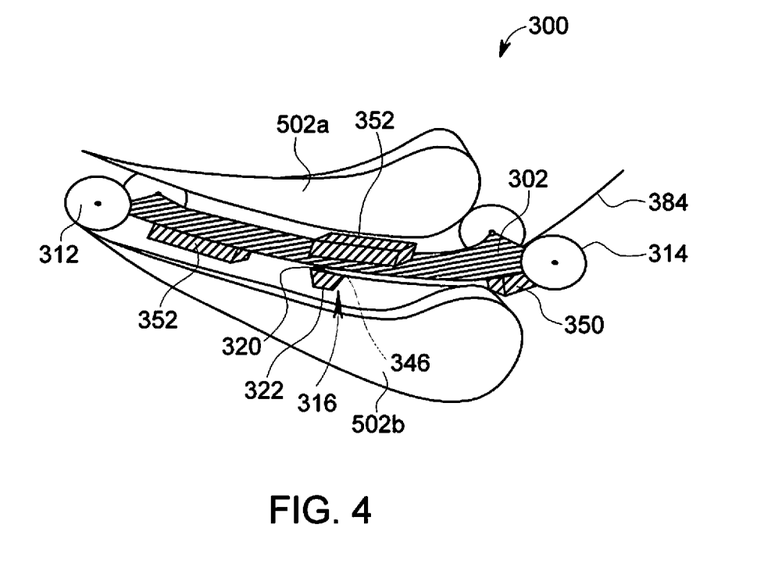
FIG. 4 illustrates one embodiment of a maintenance apparatus inserted into a turbine assembly.

FIG. 4 illustrates the maintenance apparatus 300 inserted in-between adjacent airfoils of the turbine assembly 10. The flexible carriage 302 is configured to move in-between interior components of the turbine assembly 10 during insertion and/or extraction of the maintenance apparatus 300. The maintenance apparatus 300 moves within the turbine assembly 10 to be disposed between adjacent airfoils 502a, 502b (e.g., compressor blades, turbine blades, compressor guide vanes, or turbine guide vanes). An operator outside of the turbine assembly (not shown) directs insertion of the maintenance apparatus 300 into the turbine assembly 10. For example, an operator may move the maintenance apparatus 300 into and through the turbine assembly 10 using the insertion device 351 attached to the maintenance apparatus 300 via the mating component 350. The maintenance apparatus 300 may be inserted into the turbine assembly 10 by manual control of the insertion device 351 by an operator outside of the turbine assembly 10. The maintenance apparatus 300 may be inserted into the turbine assembly 10 by robotic control of the insertion device 351. Robotic control of the insertion device 351 may be performed tactilely and/or by remotely sensing the position and interaction forces of the maintenance apparatus 300 and the insertion device 351 with regard to the turbine assembly 10. Controlling motors adjust the position and configuration of the maintenance apparatus 300 and insertion device 351 until a goal position and/or interaction forces are reached. Additionally or alternatively, the maintenance apparatus 300 may be inserted into the turbine assembly 10 by a combination of these methods or by alternative methods.

FIG. 4 illustrates the anchoring device 316 in the preset position. For example, when the anchoring device 316 is in the preset position, the maintenance apparatus 300 is free to move within the turbine assembly 10 between adjacent airfoils 502. The maintenance apparatus 300 is tethered by the insertion device 351 (of FIG. 3) via the mating component 350 when the anchoring device 316 is in the preset position.

The trigger wire 384 is operably connected with the trigger mechanism 346 and the locking pad retainer 345 of the anchoring device 316 when the anchoring device 316 is in the preset position, as illustrated in FIG. 2B. Withdrawal of the trigger wire 384 from the trigger mechanism 346 and the locking pad retainer 345 releases the one or more springs 320 of the anchoring device 316 and the anchoring device 316 moves into the deployed position, as illustrated in FIG. 2C.

Figure 5:
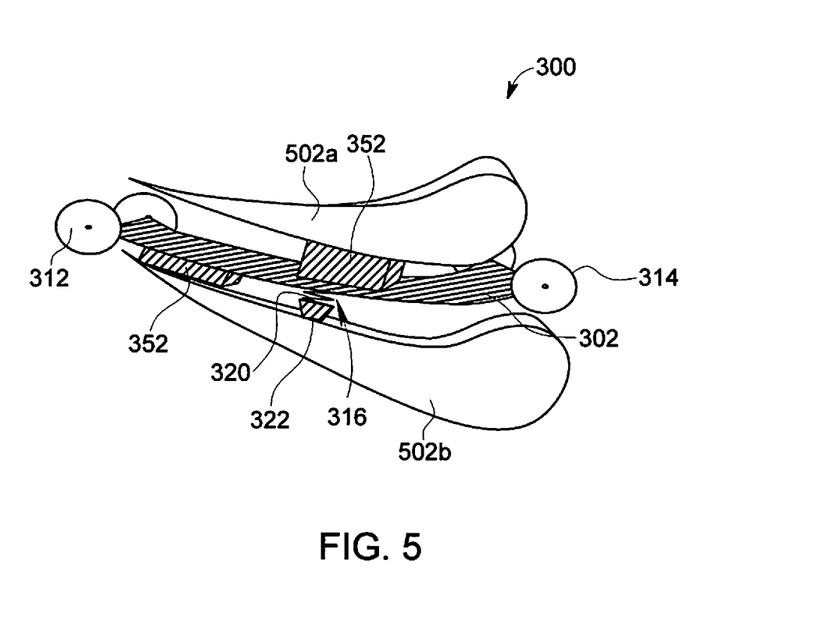
FIG. 5 illustrates one embodiment of a maintenance apparatus attached to a turbine assembly.

FIG. 5 illustrates the anchoring device 316 of the maintenance apparatus 300 in the deployed position. In the deployed position, the trigger wire 384 is withdrawn from the trigger mechanism 346 of the maintenance apparatus 300. The maintenance apparatus 300 is thus anchored in a position between adjacent airfoils 502 of the turbine assembly 10. For example, when the anchoring device 316 is in the deployed position, the maintenance apparatus 300 is anchored between adjacent airfoils 502a, 502b of the turbine assembly 10. When the maintenance apparatus 300 is anchored, one or more carriage pads 352 on the back side 326 of the flexible carriage 302 are in contact with the airfoil 502a and the mating surface 322 of the locking pad 318 (of FIG. 2A) is in contact with the adjacent airfoil 502b of the turbine assembly 10. The one or more springs 320 mechanically maintain the maintenance apparatus 300 at a position between adjacent airfoils 502a, 502b by exerting a compressive force through the anchoring device 316 and the one or more carriage pads 352 of the flexible carriage 302. The maintenance apparatus 300 is operably coupled with the adjacent airfoils 502a, 502b when the anchoring device 316 is in the deployed position. Additionally or alternatively, the maintenance apparatus 300 may be anchored within the turbine assembly 10 by alternative methods. For example, the maintenance apparatus 300 may attach to, press/wedge into, hold/grab onto, pull between, stick to, clamp onto, wrap around, or the like, one or more surfaces of the turbine assembly 10. For example, the maintenance apparatus 300 may be anchored using various forces and/or materials such as magnetic, mechanical, electro-static, adhesive, or the like.

Withdrawal of the trigger wire 384 moves the locking clip 378 of the mating component 350 to the unlocked position. The mating component 350 of the insertion device 351 can be removed from the receiving orifice 370 of the attachment bracket 368 when the locking clip 378 is in the unlocked position. For example, the mating component 350 may be detached from the maintenance apparatus 300 when the locking clip 378 disengages from the locking slot 390. For example, the maintenance apparatus 300 is partially or completely untethered when the mating component 350 (and therefore the insertion device 351) is detached from the maintenance apparatus 300.

The maintenance tool 304 can do one or more of inspect or repair one or more interior surfaces of the turbine assembly 10. For example, the inspection or repair are carried out when the maintenance apparatus 300 is anchored between adjacent airfoils of the turbine assembly 10 and the maintenance apparatus 300 is untethered. Using the rotor motion to access stationary or rotating components around the turbine circumference, the maintenance tool 304 may one or more of inspect or repair one or more surfaces of the turbine assembly 10. For example, the maintenance apparatus 300 is positioned such that it does not interfere with components of the turbine assembly 10 during rotor motion. For example, the maintenance apparatus 300 may be untethered when the maintenance apparatus 300 is anchored between adjacent airfoils of the turbine assembly 10. Optionally, the maintenance apparatus 300 may be operably coupled with one or more of a cable, wire, or the like extending outside of the turbine assembly 10 when the maintenance apparatus 300 is anchored between adjacent airfoils. As discussed above, the maintenance tool 304 of the maintenance apparatus 300 may comprise various embodiments, as illustrated in FIGS. 6, 7, and 8.

Figure 6:
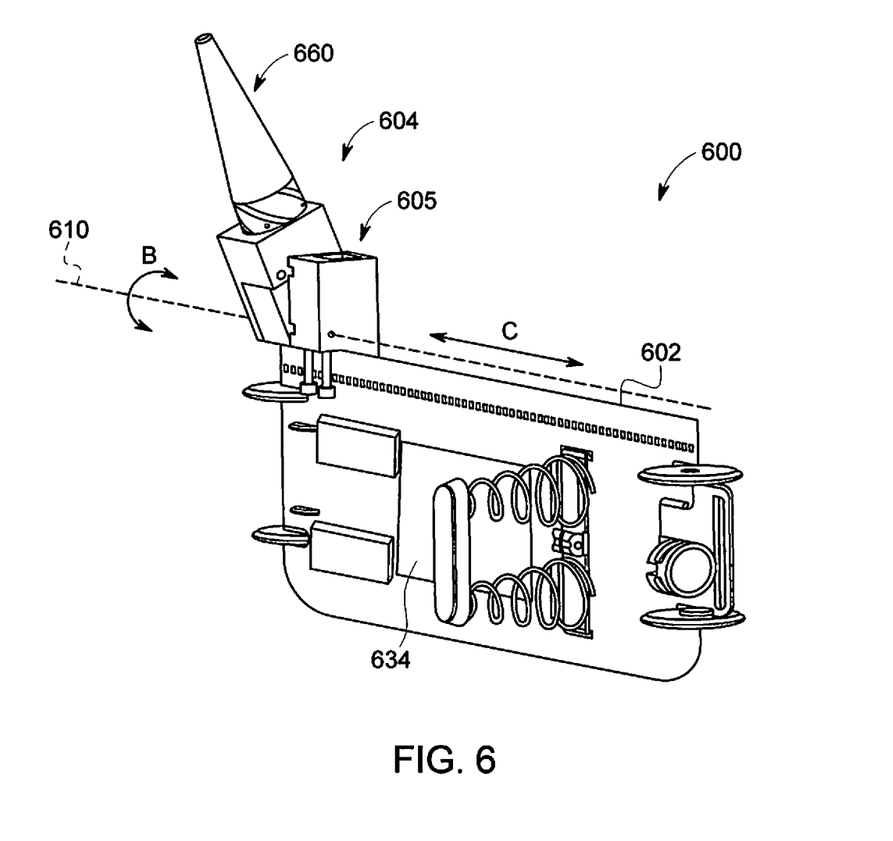
FIG. 6 illustrates one embodiment of a maintenance tool of a maintenance apparatus.

FIG. 6 illustrates a maintenance tool 604 in accordance with one embodiment. The maintenance tool 604 is disposed on a maintenance apparatus 600 (corresponding to the maintenance apparatus 300 of FIG. 2A). The maintenance tool 604 is operably coupled with a motor system 605 (corresponding to the motor system 305 of FIG. 2A). The motor system 605 comprises one or more of an axial traverse motor, a pivot motor, or an extension motor that move the maintenance tool 604 relative to a flexible carriage 602. The motor system 605 receives control signals that are remotely communicated from an external system (not shown) to an electronic system 634 (corresponding to the electronic system 334 of FIG. 2A). The axial traverse motor (not shown) moves the maintenance tool along the body of a flexible carriage 602. For example, the axial traverse motor moves the maintenance tool 604 along the longitudinal axis 610 of the flexible carriage 602 in a direction C. The pivot motor (not shown) pivots the maintenance tool 604 about the longitudinal axis 610 in a direction of arc B. The extension motor (not shown) radially extends the maintenance tool 604 to a position away from the flexible carriage 602 in a direction normal to the longitudinal axis 610.

The maintenance tool 604 comprises a nozzle 660. The nozzle extends in a direction generally away from the flexible carriage 602 normal to the longitudinal axis 610. The nozzle 660 is joined to a reservoir contained within the nozzle 660. The reservoir contains repair material. For example, the reservoir may contain repair slurry, braze paste, or the like. The reservoir is operably joined to the nozzle 660 such that the repair material moves from the reservoir through the nozzle 660 in order to be dispensed onto an interior surface of the turbine assembly 10. For example, when the maintenance apparatus 600 is anchored between adjacent airfoils (e.g., 502a, 502b of FIG. 5), the rotor shaft 26 (of FIG. 1) is turned to bring the maintenance apparatus 600 in general proximity of the region within the turbine assembly 10 requiring repair, and the axial traverse motor, the pivot motor, and/or the extension motor may position the maintenance tool 604, such as the nozzle 660, proximate the interior surface of the turbine assembly 10 that needs repair. The region within the turbine assembly 10 requiring repair may comprise cracks, coating loss, worn surfaces, or the like. For example, the region may need repair material applied onto the interior surface of the turbine assembly 10 in order to repair such region.

Figure 7:
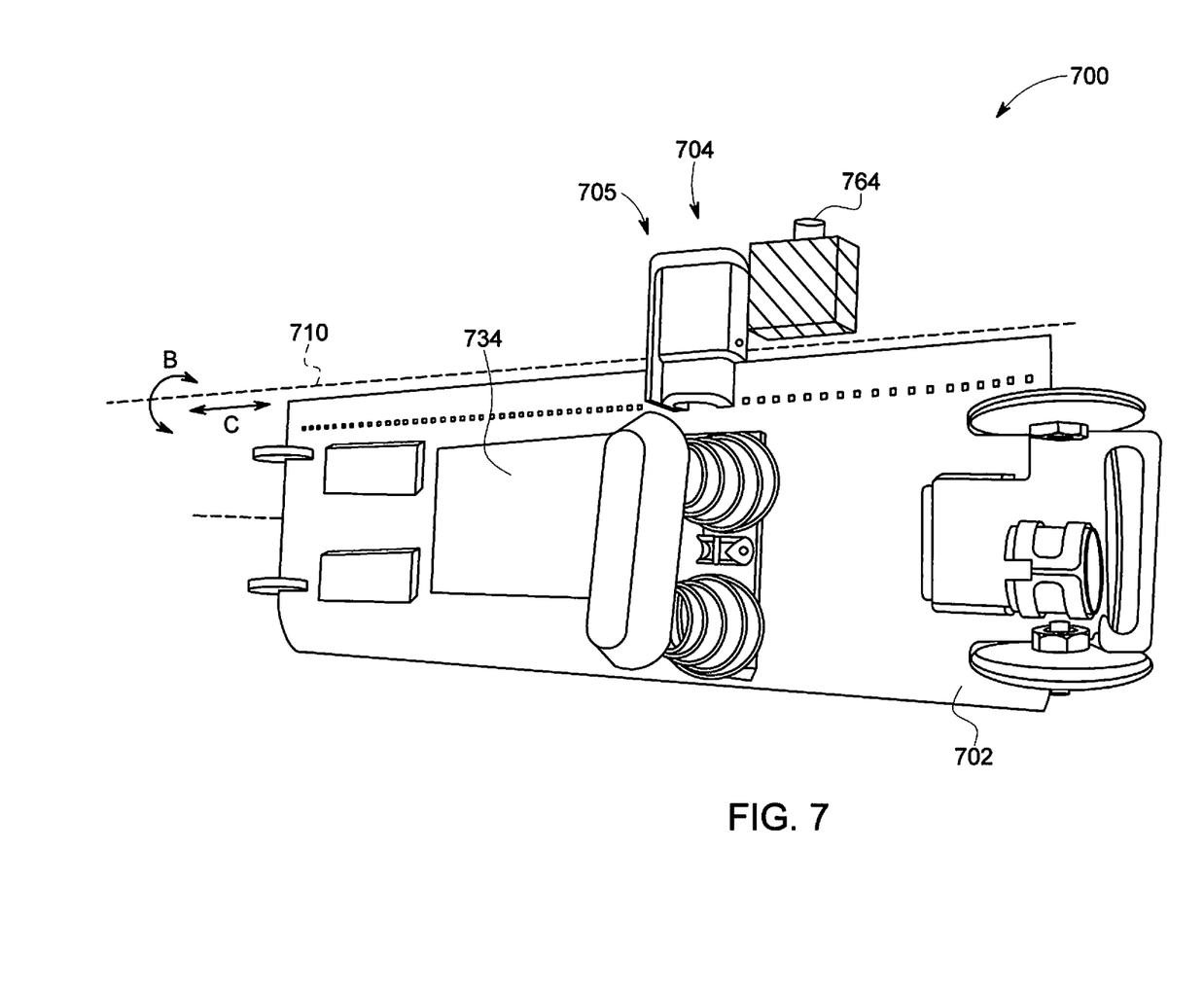
FIG. 7 illustrates one embodiment of a maintenance tool of a maintenance apparatus.
Figure 8:
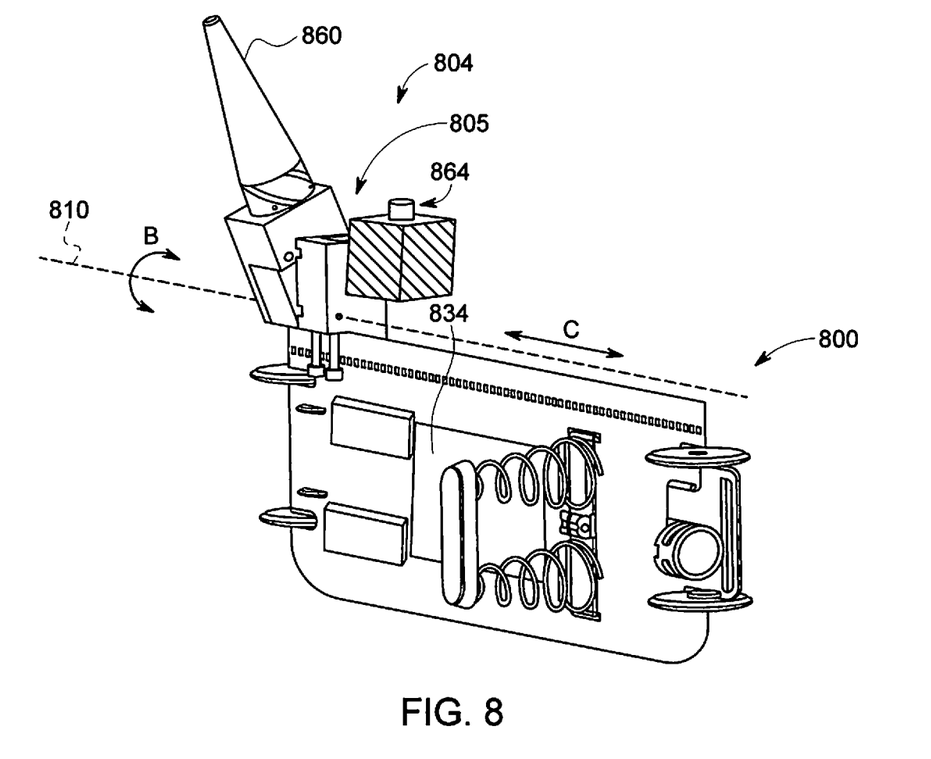
FIG. 8 illustrates one embodiment of a maintenance tool of a maintenance apparatus.

FIG. 7 illustrates a maintenance tool 704 in accordance with one embodiment. The maintenance tool 704 is disposed on a maintenance apparatus 700 (corresponding to the maintenance apparatus 300 of FIG. 2A). The maintenance tool 704 is operably coupled with a motor system 705 (corresponding to the motor system 305 of FIG. 2A). The motor system 705 comprises one or more of an axial traverse motor, a pivot motor, or an extension motor. The motor system 705 receives control signals that are remotely communicated from an external system (not shown) to an electronic system 734 (corresponding to the electronic system 334 of FIG. 2A). The axial traverse motor (not shown) moves the maintenance tool along a longitudinal axis 710 of a flexible carriage 702 in a direction C. The pivot motor (not shown) pivots the maintenance tool 704 about the longitudinal axis 710 in a direction of arc B. The extension motor (not shown) radially extends the maintenance tool 704 to a position away from the flexible carriage 702 in a direction normal to the longitudinal axis 710.

The maintenance tool 704 comprises a sensor, such as a camera 764. FIG. 7 illustrates the maintenance tool 704 comprising one camera 764. Optionally, the maintenance tool 704 may comprise one or more cameras 764. The camera 764 generates image data representative of one or more surfaces of the turbine assembly 10 within a field of view of the camera 764. For example, the camera 764 may acquire images of the one or more surfaces of the turbine assembly to locate defects. Alternatively, the sensor may comprise a remote or contact-based sensing system. For example, the sensing system may be used to characterize surface defects, such as to build a 3D surface model of the one or more surfaces of the turbine assembly 10. Alternatively, the sensor may use a thermal imaging system to thermally locate surface defects located near one or more surfaces of the turbine assembly 10. Additionally or alternatively, the sensor may generate eddy current data, acoustic data, surface profilometry data, or the like. Alternatively, the sensor may collect data representative of one or more surfaces using alternative methods.

The camera 764 is operably connected with the electronic system 734. The images generated by the camera 764 may be remotely communicated to a processor outside of the turbine assembly 10 (not shown). Optionally, the generated images may be autonomously reviewed, stored and/or manipulated onboard the maintenance apparatus 700. For example, the control system 734 of the maintenance apparatus 700 may include decision software to conduct image review autonomously. The generated images may be reviewed in order to locate a position on one or more surfaces of the turbine assembly 10 that needs to be repaired. Additionally or alternatively, the images may be stored in a memory that can be used to review the state of the surfaces of turbine assembly 10 during and/or after inspection.

FIG. 8 illustrates a maintenance tool 804 in accordance with one embodiment. The maintenance tool 804 is disposed on a maintenance apparatus 800 (corresponding to the maintenance apparatus 300 of FIG. 2A). The maintenance tool 804 is operably coupled with a motor system 805 (corresponding to the motor system 305 of FIG. 2A). The motor system 805 comprises one or more of an axial traverse motor, a pivot motor, or an extension motor. The motor system 805 receives control signals that are remotely communicated from an external system (not shown) to an electronic system 834 (corresponding to the electronic system 334 of FIG. 2A). The axial traverse motor (not shown) moves the maintenance tool along a longitudinal axis 810 of a flexible carriage 802 in a direction C. The pivot motor (not shown) pivots the maintenance tool 804 about the longitudinal axis 810 in a direction of arc B. The extension motor (not shown) radially extends the maintenance tool 804 to a position away from the flexible carriage 802 in a direction normal to the longitudinal axis 810.

The maintenance tool 804 comprises a nozzle 860, a reservoir contained within the nozzle, and a camera 864. The maintenance tool 804 generates image data of one or more surfaces of the turbine assembly 10 and dispenses repair material through the nozzle 860 onto the one or more surfaces of the turbine assembly 10. The axial traverse motor, the pivot motor, and/or the extension motor position the camera 864 and nozzle 860 at a goal location within the turbine assembly 10 when the maintenance apparatus 800 is anchored between adjacent airfoils (e.g., 502a, 502b of FIG. 5) of the turbine assembly 10. The maintenance apparatus 800 may be anchored between rotating airfoils of the turbine assembly such that, as the rotor is turned, the maintenance apparatus 800 moves with the rotation of the rotor and allows the camera to generate image data of stationary components (e.g., guide vanes, shrouds, etc.) of the turbine assembly 10. Additionally or alternatively, the maintenance apparatus 800 may be anchored between stationary airfoils of the turbine assembly 10 such that, as the rotor is turned, the camera 864 generates image data of the rotating components (e.g., blades) of the turbine assembly 10. Optionally, the axial traverse motor, the pivot motor, and/or the extension motor may position the maintenance tool 804, including the camera 864, proximate the features of the interior surface of the turbine assembly 10 that are being inspected.

The camera 864 (corresponding to camera 764 of FIG. 7) is operably connected with the electronic system 834. The generated image data is remotely transmitted to a display device outside of the turbine assembly 10 to be reviewed. The transmitted images may locate a position on one or more interior surfaces of the turbine assembly 10 that needs repair. The axial traverse motor, the pivot motor, and/or the extension motor may position the nozzle 860 at a position within the turbine assembly 10 in order to apply repair material onto the located position of the interior surface of the turbine that requires repair. The nozzle 860 dispenses repair material onto the one or more damaged surfaces of the turbine assembly 10.

Figure 9:
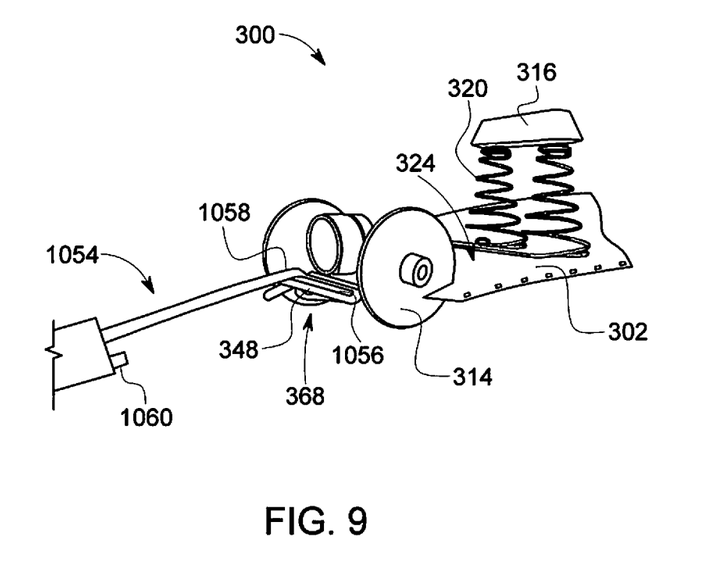
FIG. 9 illustrates one embodiment of a removal feature of a maintenance apparatus.

FIG. 9 illustrates one embodiment of the removal feature 348 of the attachment bracket 368 operably joined to the maintenance apparatus 300. The removal feature 348 comprises a removal slot 1056. A removal device 1054 comprises a hook 1058 at a proximal end. The hook 1058 engages with the removal slot 1056 of the removal feature 348 to facilitate extraction of the maintenance apparatus 300 from the turbine assembly 10. The removal slot 1056 is sized and/or shaped to receive the hook 1058. Optionally, the removal device 1054 may comprise an alternative shape and/or size to the removal hook 1058. Optionally, the removal device 1054 may operably join to the removal feature 348 using an alternative coupling method, such as using magnetic or threaded couplings. The removal device 1054 is configured to move through the turbine assembly 10 to the maintenance apparatus 300. The removal device 1054 has sufficient flexibility to allow it to access the removal feature 348 of the maintenance apparatus 300 and to retrieve the maintenance apparatus 300 from the turbine assembly 10. The removal device 1054 may be manually or autonomously controlled to move through the turbine assembly 10. Additionally or alternatively, the removal device 1054 may comprise a camera 1060, such as an endoscopic camera, to guide the removal device 1054 within the turbine assembly and into engagement with the removal feature 348 of the maintenance apparatus 300. For example, the camera 1060 disposed on the removal device 1054 may guide the positioning of the removal hook 1058 into the removal slot 1056. Optionally, the camera 1060 may guide the removal device 1054 as the removal device 1054 extracts the maintenance apparatus 300 from the turbine assembly 10. The flexible carriage 302 is configured to flexibly move about interior components of the turbine assembly 10 during extraction of the maintenance apparatus 300 from the turbine assembly 10.

Figure 10:
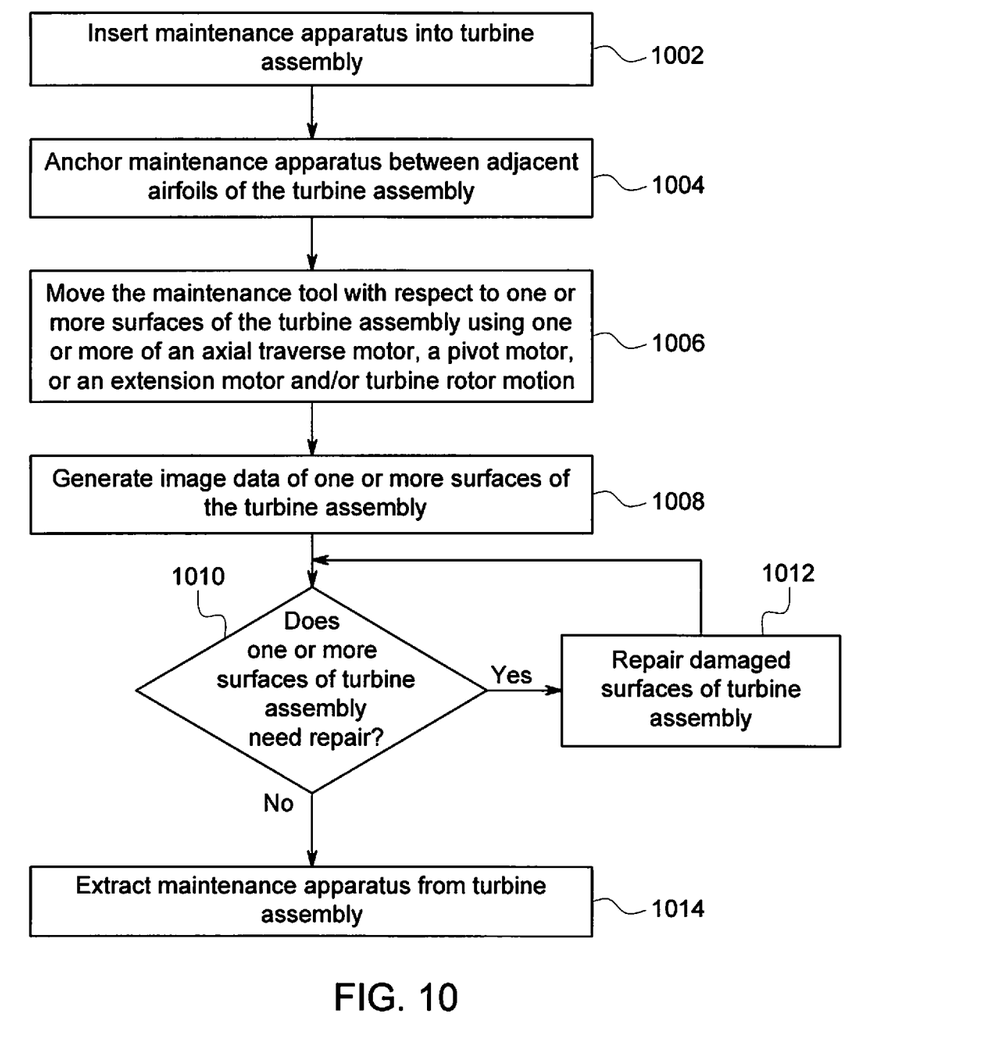
FIG. 10 illustrates a flowchart of a method of operations of a maintenance apparatus in accordance with one embodiment.

FIG. 10 illustrates one embodiment of a method of operation of the maintenance apparatus 300. One or more steps of the method of FIG. 10 may be performed by an operator outside of the turbine assembly 10, autonomously by local control software installed on the maintenance apparatus 300, autonomously by remote control software outside of the turbine assembly 10, or the like. At 1002, the maintenance apparatus 300 is inserted into the turbine assembly 10 using the insertion device 351. The maintenance apparatus 300 is tethered by one or more of the trigger wire 384 and the insertion device 351 via the mating component 350 when the maintenance apparatus 300 is inserted into the turbine assembly 10. For example, the maintenance apparatus 300 is tethered by the insertion device 351 extending outside of the turbine assembly 10. At 1004, the maintenance apparatus 300 is anchored into a position between adjacent airfoils 502a and 502b of the turbine assembly 10. For example, the trigger wire 384 is withdrawn from the trigger mechanism 346 and locking pad retainer 345 when the maintenance apparatus 300 is disposed at a position between adjacent rotating or stationary airfoils. Removing the trigger wire 384 moves the anchoring device 316 into the deployed position and anchors the maintenance apparatus 300 between adjacent airfoils 502a and 502b. Withdrawal of the trigger wire 384 moves the locking clip 378 of the mating component 350 to the unlocked position, allowing the mating component 350 (and therefore the insertion device 351) to detach from the attachment bracket 368 of the maintenance apparatus 300. For example, when the maintenance apparatus 300 is in the anchored position, the maintenance apparatus 300 is maintained between adjacent airfoils of the turbine assembly 10 by the anchoring device 316 applying a force between the maintenance apparatus 300 and the adjacent airfoils.

At 1006, the shaft 26 of the turbine assembly 10 is rotated to move the maintenance apparatus 300 circumferentially relative to surfaces of the turbine assembly 10. The maintenance tool 304 is moved with respect to the flexible carriage 302 by one or more of the axial traverse motor, the pivot motor, or the extension motor. For example, the one or more of the axial traverse motor, the pivot motor, or the extension motor positions the maintenance tool in proximity of the surfaces of the turbine assembly 10.

At 1008, a camera of the maintenance tool 304 generates image data of one or more interior surfaces of the turbine assembly 10. The image data may be remotely communicated to a viewing, processing, or storage system outside of the turbine assembly 10 using wireless or wired communication methods. Optionally, the image data may be stored in an on-board memory. Optionally, the image data may be autonomously reviewed and/or manipulated onboard the maintenance tool 304.

At 1010, a decision made whether one or more interior surfaces of the turbine assembly 10 need repair. If no interior surfaces of the turbine assembly 10 need repair, then flow of the method continues to 1014. If the image data indicates that one or more interior surfaces of the turbine assembly 10 is worn, cracked, suffered coating loss, or the like, flow of the method continues to 1012. At 1012, damaged surfaces are repaired. For example, the nozzle of the maintenance tool 304 dispenses repair material onto the damaged region of the turbine assembly 10. After the one or more surfaces is repaired, flow of the method returns to 1010.

At 1014, the maintenance apparatus 300 is extracted from the turbine assembly 10. For example, the maintenance apparatus 300 is extracted from the turbine assembly 10 using the removal device 1054.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A maintenance apparatus comprising:
   a flexible carriage comprising an elongated strip of flexible material capable of anchoring between adjacent airfoils of a turbine assembly;
   a maintenance tool operably coupled with the elongated strip of flexible material between a first end of the elongated strip of flexible material and a second end of the elongated strip of flexible material, the maintenance tool configured to one or more of generate image data representative of one or more surfaces of the turbine assembly or repair the one or more surfaces of the turbine assembly; and
   one or more motors operably coupled with the maintenance tool and configured to move the maintenance tool to one or more different positions between the first and second ends of the elongated strip of flexible material of the flexible carriage.

2. The maintenance apparatus of claim 1, wherein the flexible carriage has an elongated body, and wherein the one or more motors include an axial traverse motor configured to move the maintenance tool along the elongated body of the flexible carriage while the flexible carriage is anchored between the adjacent airfoils of the turbine assembly.

3. The maintenance apparatus of claim 1, wherein the one or more motors include a pivot motor configured to pivot the maintenance tool along an arc relative to the flexible carriage while the flexible carriage is anchored between the adjacent airfoils of the turbine assembly.

4. The maintenance apparatus of claim 1, wherein the one or more motors include an extension motor configured to radially extend the maintenance tool a distance away from the flexible carriage while the flexible carriage is anchored between the adjacent airfoils of the turbine assembly.

5. The maintenance apparatus of claim 1, wherein the flexible carriage is configured to flexibly move about interior components of the turbine assembly during one or more of inserting or extracting of the maintenance apparatus into or out of the turbine assembly.

6. The maintenance apparatus of claim 1, wherein the maintenance apparatus is configured to be detachably coupled with a mating component of an insertion device that inserts the maintenance apparatus into the turbine assembly, wherein the maintenance apparatus is untethered during one or more of generating of the image data or repairing the one or more surfaces of the turbine assembly.

7. The maintenance apparatus of claim 1, wherein the maintenance tool is a camera configured to generate image data of one or more surfaces of the turbine assembly.

8. The maintenance apparatus of claim 7, wherein the camera is configured to remotely communicate the image data.

9. The maintenance apparatus of claim 1, further comprising an anchoring device configured to maintain a position of the maintenance apparatus within the turbine assembly relative to the airfoils.

10. The maintenance apparatus of claim 1, wherein the maintenance tool includes a nozzle, the nozzle configured to dispense repair material onto the one or more surfaces of the turbine assembly.

11. The maintenance apparatus of claim 1, further comprising an antenna configured to remotely receive control signals that remotely control operation of one or more of the maintenance tool or the one or more motors.

12. A maintenance apparatus comprising:
a flexible carriage comprising an elongated strip of flexible material capable of anchoring between adjacent airfoils of a turbine assembly;
a maintenance tool operably coupled with the elongated strip of flexible material between a first end of the elongated strip of flexible material and a second end of the elongated strip of flexible material, the maintenance tool configured to one or more of generate image data representative of one or more surfaces of the turbine assembly or repair the one or more surfaces of the turbine assembly;
one or more motors operably coupled with the maintenance tool and configured to move the maintenance tool to one or more different positions between the first and second ends of the elongated strip of flexible material of the flexible carriage;
wherein the flexible carriage is configured to flexibly move about interior components of the turbine assembly during one or more of inserting or extracting of the maintenance apparatus into or out of the turbine assembly.

13. The maintenance apparatus of claim 12, wherein the flexible carriage has an elongated body, and wherein the one or more motors includes an axial traverse motor configured to move the maintenance tool along the elongated body of the flexible carriage while the flexible carriage is anchored between the adjacent airfoils of the turbine assembly.

14. The maintenance apparatus of claim 12, wherein the one or more motors include a pivot motor configured to pivot the maintenance tool along an arc relative to the flexible carriage while the flexible carriage is anchored between the adjacent airfoils of the turbine assembly.

15. The maintenance apparatus of claim 12, wherein the one or more motors include an extension motor configured to radially extend the maintenance tool a distance away from the flexible carriage while the flexible carriage is anchored between the adjacent airfoils of the turbine assembly.

16. The maintenance apparatus of claim 12, wherein the maintenance apparatus is configured to be detachably coupled with a mating component of an insertion device that inserts the maintenance apparatus into the turbine assembly, wherein the maintenance apparatus is untethered during one or more of generating of the image data or repairing the one or more surfaces of the turbine assembly.

17. The maintenance apparatus of claim 12, wherein the maintenance tool is a camera configured to generate image data of one or more surfaces of the turbine assembly.

18. The maintenance apparatus of claim 17, wherein the camera is configured to remotely communicate the image data.

19. The maintenance apparatus of claim 12, further comprising an anchoring device configured to maintain a position of the maintenance apparatus relative to the airfoils.

20. The maintenance apparatus of claim 12, wherein the maintenance tool includes a nozzle, the nozzle configured to dispense repair material onto the one or more surfaces of the turbine assembly.

21. The maintenance apparatus of claim 12, further comprising an antenna configured to remotely receive control signals that remotely control operation of one or more of the maintenance tool or the one or more motors.

22. A method comprising:
anchoring a maintenance apparatus between adjacent airfoils of a turbine assembly, the maintenance apparatus comprising a flexible carriage comprising an elongated strip of flexible material, a maintenance tool operably coupled to the elongated strip of flexible material between a first end of the elongated strip of flexible material and a second end of the elongated strip of flexible material, and one or more motors;
moving the maintenance tool to one or more different positions between the first and second ends of the elongated strip of the flexible material of the flexible carriage; and
one or more of generating image data representative of one or more surfaces of the turbine assembly or repairing the one or more surfaces of the turbine assembly.

23. The method of claim 22, further comprising anchoring the maintenance apparatus into a position relative to the airfoils.

24. The method of claim 22, wherein the one or more of generating image data or repairing the one or more surfaces occur autonomously.

25. The method of claim 22, further comprising positioning the maintenance apparatus between the adjacent airfoils with an insertion device extending outside of the turbine assembly, deploying an anchoring device, and detaching the insertion device from the maintenance apparatus.

* * * * *